J. W. REDDING.
BELT TIGHTENER.
APPLICATION FILED SEPT. 26, 1910. RENEWED AUG. 14, 1912.
1,051,759.
Patented Jan. 28, 1913.
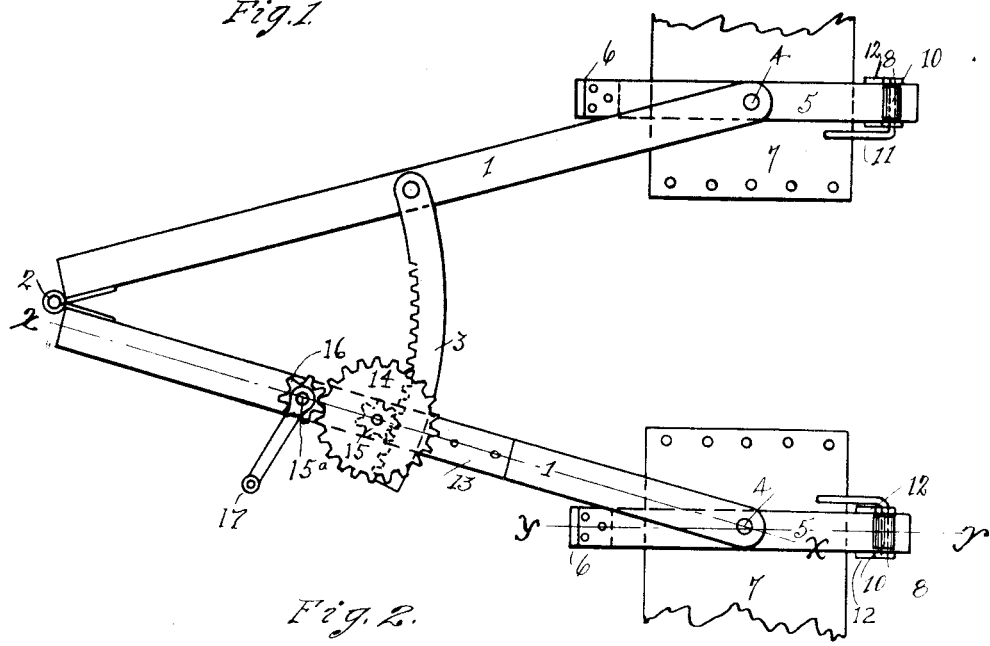
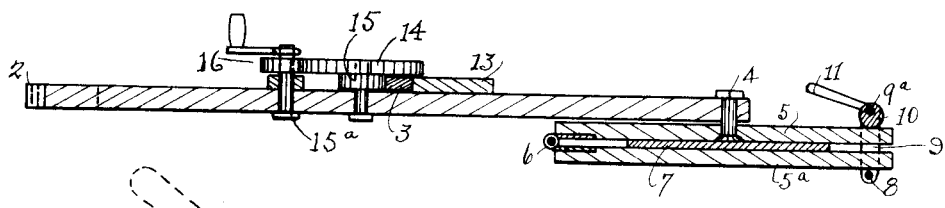
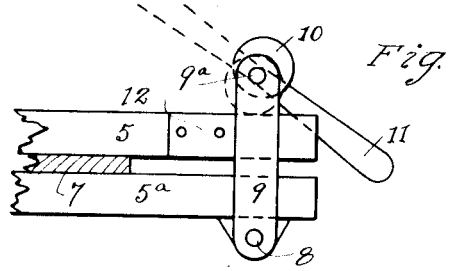
Witnesses:
John Back
Carl Erickson
Inventor
J. W. Redding
by Fred P. Gorm
Attorney

UNITED STATES PATENT OFFICE.

JOHN W. REDDING, OF SEATTLE, WASHINGTON, ASSIGNOR TO C. E. HIGGINS, OF SEATTLE, WASHINGTON.

BELT-TIGHTENER.

1,051,759.  Specification of Letters Patent.  Patented Jan. 28, 1913.

Application filed September 26, 1910, Serial No. 583,939. Renewed August 14, 1912. Serial No. 715,128.

*To all whom it may concern:*

Be it known that I, JOHN W. REDDING, a citizen of the United States, and a resident of Seattle, in the county of King and State of Washington, have invented certain new and useful Improvements in Belt-Tighteners, of which the following is a full, true, and exact specification.

The principal object of my invention is to provide an apparatus of this class of simple and inexpensive construction, having great power, and quickly attachable to the ends of a belt to draw the same together to be laced, the apparatus being so constructed as to be out of the way of the operator during the process of lacing the ends together.

Referring to the accompanying drawings, Figure 1 is a plan view of my improved belt tightener as applied to the ends of a belt, the outer ends of the latter being broken away. Fig. 2 is a longitudinal sectional view of one of the arms upon the line *x—x* of Fig. 1, the attached clamp showing in central section upon the line *y—y* of Fig. 1. Fig. 3 is an enlarged fragmentary view, in side elevation, of one of the clamps, the belt showing in cross section.

Reference character 1 designates twin arms hinged together at 2, secured to one of which arms is the rack 3 in the form of an arc of a circle having its center at 2. At the outer ends of both the arms 1 is pivotally mounted at 4 the crosspieces 5 and 5ª which are hinged together at 6 and adapted to embrace the ends of the belt 7. Upon the outer ends of the crosspieces 5 are pivotally mounted, at 8, the bails 9, between the upper ends of which are mounted the rollers 10, through which rollers eccentrically pass the shafts 9ª, which shafts are rigidly secured to the rollers 10, but which pass loosely through perforations in the upper ends of the bails 9, one end of each of the shafts 9ª terminating in a lever 11. Extending from each of the crosspieces 5 are the projections 12 which form limit stops for the swinging bails 9. Upon one of the arms 1 is secured a guide or brace 13 for the rack 3. Upon the same arm is mounted the wheel 14, to which is secured the pinion 15, which pinion meshes with the teeth of the rack 3. Through the same arm loosely passes the pin 15ª to which is secured the pinion wheel 16 which meshes with the teeth of the wheel 14, the crank 17 being secured to the upper end of the pin 15ª.

It is thought that the construction and operation of my improved belt tightener will be fully understood from the foregoing description, it being obvious that the ends of the belt 7, after the belt has been passed around its pulleys, may be placed between the crosspieces 5 and 5ª, which may be quickly and securely clamped together by raising the lever 11 from its position as shown in full lines to its position as shown in dotted lines (Fig. 3), the eccentric action of the roller 10 bringing approximately that portion of its peripheral surface which is farthest from the center of the shaft 9ª into contact with the upper surface of the crosspiece 5, after which a downward pressure upon the lever 11 will draw the crosspieces 5 and 5ª together and clamp the belt, as clearly shown in the drawings. By turning the crank 17 the arms 1, through the pinion 16, wheel 14, and pinion 15 and rack 3, are drawn together until the ends of the belt meet, ready to be laced together.

I am fully aware that it is not new in the art to employ means to draw the ends of a belt together, for lacing, but serious defects exist in the means heretofore employed for this purpose, in that their use prevents free access to the perforated ends of the belt, thereby prolonging the operation of lacing. It will be observed that after the ends of the belt have been drawn together by means of my improved tightener, the perforated ends of the belt are readily accessible and can be quickly laced together. It will, of course, be appreciated that the mending of a broken belt is frequently the cause of the loss of much time, an entire crew of men being idle in consequence thereof, and that a few minutes saved in such mending is often of great value.

While I have shown a particular embodiment of my invention, I am aware that many changes will readily suggest themselves to others skilled in the art, without departing from the spirit and scope thereof, and I do not therefore, desire to be limited to the exact form herein shown and described.

What I claim is—

A belt tightener comprising a pair of arms hinged together at one of their ends and having clamps pivotally mounted upon their opposite ends, means on said arms for drawing the same together, a curved rack upon one of said arms meshing with a pinion upon the other arm, a gear wheel secured to the top of said pinion and extending out over the rack whereby the latter is held to its work in one direction, and a block or extension upon the same arm to hold the rack to its work in a horizontal direction.

JOHN W. REDDING.

Witnesses:
 FRED P. GORIN,
 A. V. REDDING.